Jan. 23, 1962 I. COHEN 3,017,800
ANCHOR BOLT WITH EXPANDING SLEEVE
Filed Aug. 15, 1958 2 Sheets-Sheet 1
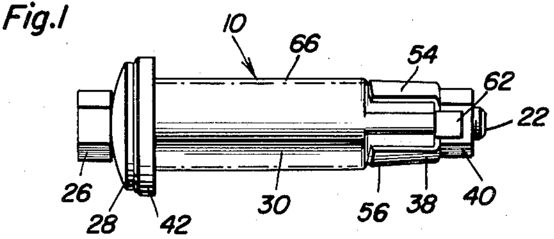
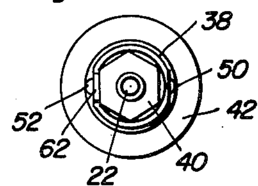
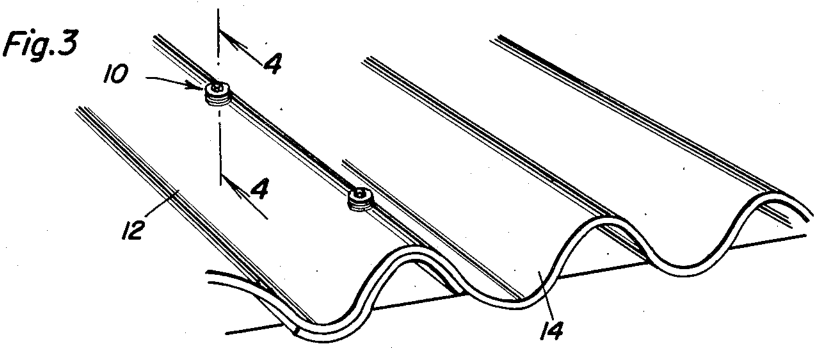
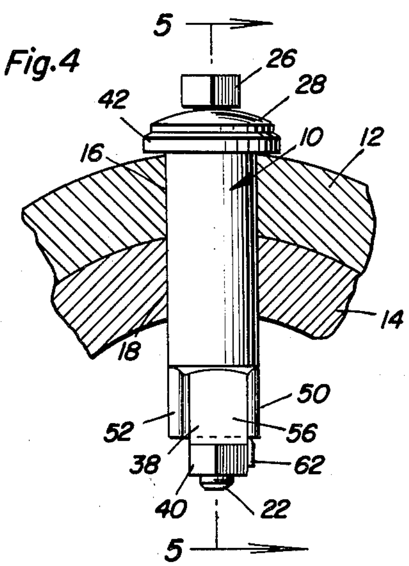
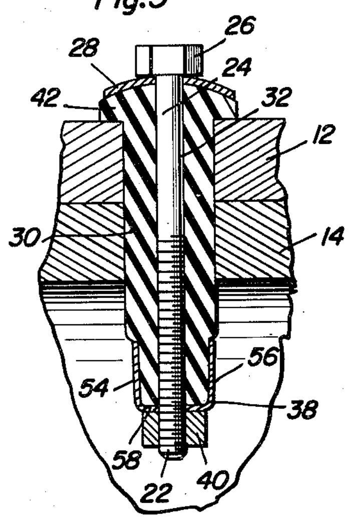
Irvin Cohen
INVENTOR.
BY Clarence A. O'Brien and Harvey B. Jacobson Attorneys

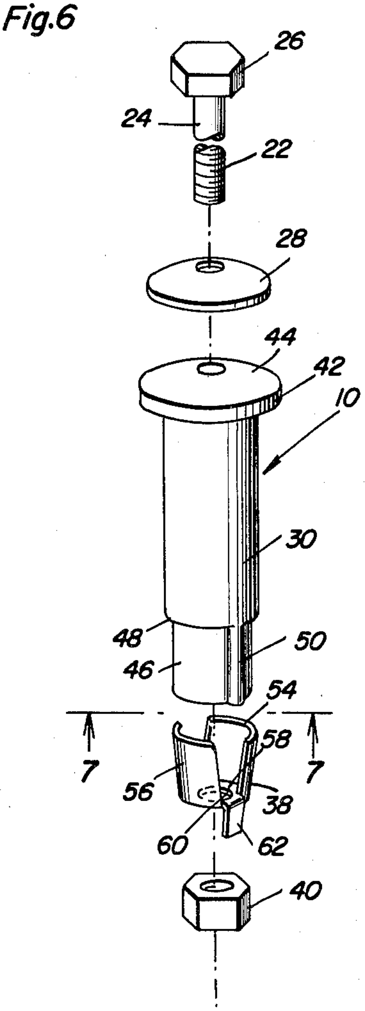
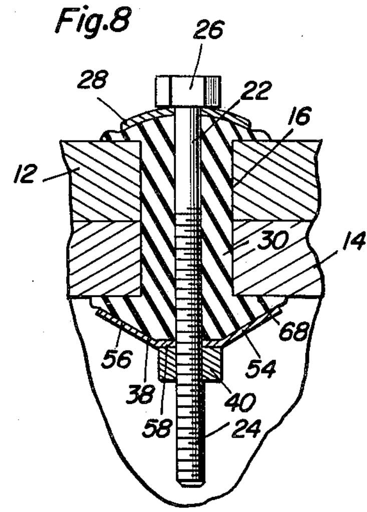
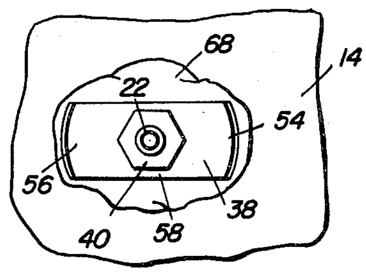
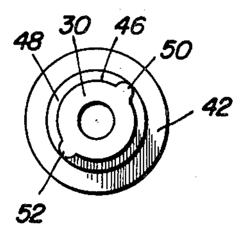
Irvin Cohen
INVENTOR.
BY Clarence A. O'Brien and Harvey B. Jacobson
Attorneys United States Patent Office 3,017,800

Patented Jan. 23, 1962

3,017,800

ANCHOR BOLT WITH EXPANDING SLEEVE

Irvin Cohen, 900 N. 26th St., Reading, Pa.

Filed Aug. 15, 1958, Ser. No. 755,347
3 Claims. (Cl. 85—2.4)

This invention relates to fasteners and more particularly to construction fasteners.

At the present time it is common practice to fasten roofing or siding panels together with bolts passed through aligned openings in the panels. These bolts are tightened, requiring one man on the outside and one man on the inside of the panels so that the head and nut of the bolt can be under the control of the workers.

Asbestos corrugated siding or roofing presents problems peculiar to this type of siding. It can be tightened in place and left over a season during which it is exposed to changes in temperatures and attendant expansion and contraction. The result is that cracks appear in the siding.

This invention provides a top side fastener which can be installed completely from one side of the panel, and the fastener has extraordinary pull-out strength, made so because of the expansion of a resilient sleeve on the fastener against the walls of the holes in which the fastener is located. In addition the fastener resilient sleeve mushrooms on one surface of the panel adjacent to a spreading clip and beneath that clip making it next to impossible to ever have the fastener pull out.

An object of the invention is to provide a fastener having the exceedingly high pull-out strength discussed above and which allows the siding to expand and contract without splitting, combined with the economy of a top side fastener.

A more explicit object of the invention is to provide a fastener for asbestos siding, the fastener being mechanically simple in construction, having only a bolt, a nut, a compressible and flexible, such as neoprene, sleeve, one clip and one washer. These parts, through, are assembled in such a manner that they form a fastener that is uniquely easy to assemble with a pair of overlapped asbestos panels, especially with an electric nut driver.

One of the features of the invention is found in the way that the above mentioned parts are assembled. The sleeve has the shank of the bolt in its bore with the clip and nut at one end of the bolt. The washer is at the head end of the bolt and bears against the head of the sleeve, formed with an annular projection at one end of the sleeve. The nut is placed on the bolt and tightened slightly so that the sleeve is under a compression load. This bulges the sleeve slightly and enables the outside diameter of the sleeve to be controlled to a very fine tolerance. Also, with the compression in the sleeve, that is, the compressive load in the sleeve before the fastener is applied to the panels, some degree of additional firmness is in the sleeve. The whole purpose is to have the sleeve fit in the precisely sized overlapped holes in the asbestos siding with a fine degree of tightness so that the frictional bond existing between the surface of the sleeve and the walls of the hole help to prevent the fastener from rotating in the holes when the nut driver is applied to the head of the bolt. The collar or flange on the sleeve is nested in a concavity of a concavo-convex washer, and the flange fits flush against one of the asbestos corrugated panels. Accordingly, when a conventional electric driver is engaged on the head of the bolt and pressed against the metal washer, the flange compresses and bears firmly against a surface of the corrugated panel to form an anchor, to cooperate with the binding of the surface of the sleeve against the hole walls and prevent the fastener from rotating in the holes.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is an elevational view of a fastener constructed in accordance with the invention, this view having two dotted lines close to the longitudinal edges of the sleeve showing a small distance that the sleeve has been spread when placed under a precompression load in the manufacture of the fastener.

FIGURE 2 is a bottom view of the fastener.

FIGURE 3 is a fragmentary perspective view showing the use of the fastener.

FIGURE 4 is a sectional view on enlarged scale and taken on the line 4—4 of FIGURE 3.

FIGURE 5 is a sectional view taken on the line 5—5 of FIGURE 4.

FIGURE 6 is an exploded perspective view of the fastener.

FIGURE 7 is an end view of the sleeve only as would be seen when viewed along the line 7—7 of FIGURE 6.

FIGURE 8 is a sectional view of the fastener in its anchored state.

FIGURE 9 is a bottom plan view of the fastener in FIGURE 8 showing the way that the clip is spread and the end of the sleeve has mushroomed.

In the accompanying drawings there is a fastener 10 whose principal, although not exclusive, purpose is to fasten together two adjacent corrugated asbestos panels 12 and 14 which can be used for many purposes, among which are as roofing and as siding. In fastening panels 12 and 14 together they are overlapped, each having a hole, for instance holes 16 and 18, in alignment with each other so that fastener 10 can be pushed into the aligned holes from one side of the panels. Fastener 10 is a top side fastener eliminating the services of one man in comparison to the more common type of nut and bolt fastener.

As shown in FIGURE 6 fastener 10 is made of five pieces. There is a bolt 22 having a shank 24 and head 26. A concavo-convex washer 28 is disposed on the shank of the bolt immediately adjacent to head 26. Sleeve 30 has a bore 32 within which shank 24 is fitted. Clip 38 is also located on the shank 24, as is nut 40. This constitutes typical fastener 10.

Sleeve 30 is made of flexible, compressible material, for instance neoprene, synthetic or natural rubber or combinations thereof or an elastomeric plastic. The sleeve has a flange 42 at one end, the flange and that end of the sleeve having a convex surface 44 that fits into the concavity of concavo-convex washer 28. The opposite end of sleeve 30 has a reduced diameter part 46 separated from the major part of the sleeve by shoulder 48. Two ribs 50 and 52 extend laterally outwardly from the reduced part 46 of the sleeve, forming a substantially continuation of a part of the larger diameter, major part of the sleeve. The ribs coact with clip 38 to form a stop for the clip.

Clip 38 is constructed of one piece, having two partially cylindrical fingers 54 and 56 that diverge slightly in extending from base 58, the latter having an aperture 60 in its center. The aperture has the shank 24 of bolt 22 passed through it. Fingers 54 and 56 of the clip extend in one direction from base 58, while a small lock 62 extends from the base 58 and in the opposite direction from fingers 56 and 54. The small lock can be made as a small plate that fits flush against one of the flat sides of nut 40 thereby preventing the nut 40 from rotation with respect to the clip 38.

In manufacture and use, the fastener is assembled as described. When all parts are placed on the bolt 22, the head of the bolt is tightened a predetermined amount to cause the sleeve 30 to be longitudinally compressed so that it swells very slightly as shown by the additional thickness 66 in FIGURE 1. This also assures a particular firmness for the sleeve and is an excellent way to make sure that the sleeve diameter will remain within a very small tolerance. The fastener is driven into the aligned holes, for instance holes 16 and 18 in the overlapped asbestos panels. Due to the tightness of the sleeve in the holes a high resistance to turning exists between the sleeve of the fastener and the walls of the holes 16 and 18. Although the head 26 of the bolt can be turned with a wrench, the fastener is particularly well suited for high speed construction calling for an electric driver. The jaw of the driver seats on the convex surface of washer 28, and when the workman pushes the driver on the head of the bolt and against washer 28, flange 42 spreads slightly and binds frictionally against the outer surface of panel 12, further assuring that the fastener will not turn in the holes 16 and 18 when the power is turned on the electric driver.

As the bolt is rotated, the nut moves inwardly of the shank that is, toward the head 26. The reaction to turning is absorbed by the nut 40 and this is transmitted to lock 62 of clip 38. The clip cannot turn because it has ribs 50 and 52 disposed in the spaces between fingers 56 and 54, whereby the ribs act as stops for the clip. The tighter the nut becomes on the bolt, the greater the spreading force of the sleeve against the side walls of the holes 16 and 18 and the greater force between the lower surface of flange 42 and the surface of the panel against which it bears.

Since part of the sleeve is beyond the reach of the holes and the clip applies a high compressive force in an axial direction on the sleeve and from the lower end thereof, the sleeve lower part spreads as at 68 (FIGURE 9) and mushrooms over a generous area of siding panel 14 adjacent to hole 18. Since the fingers 54 and 56 are arcuate in cross-section, each finger will have longitudinal edges that dig into or bites into the mushroom part of the sleeve to even further enhance the gripping action between the clip and sleeve. Secondly, the existence of the flattened part of the sleeve on a surface of panel 14 prevents the clip from contacting the panel 14 so that the metallic sleeve cannot form cracks in the panel. In other words, there are no localized spots, areas or lines of very high pressure created as would be the case if the clip edges were permitted to make direct contact with the siding panel 14.

Upon tightening the fastener in place, the fingers 54 and 56 spread (FIGURES 8 and 9) and help to shape the distorted part 68 all around the hole 18 and this achieves one of the very important features of this invention namely; a weathertight fastener for a pair of panels. A very effective weather seal is formed in this way and the same holds true for the flange 42. The concavo-convex shape or at least, the concave lower surface of washer 28 causes the flange to be flattened out and spread over a generous area around hole 16 when the bolt of the fastener is tightened firmly in place. This same cushioning advantage is obtained in the distorted part 68 and the flange 42. Washer 28 does not come into direct contact with the panel 12 and therefore no spots or lines of localized exceedingly high pressure exists between the top part of the fastener and the panel adjacent to it, nor the bottom part of the fastener and panel 14. Yet, the copious quantity of compressible material in the holes (FIGURES 5 and 8) permits the siding to expand and contract under most severe weather conditions without having cracks occur adjacent to the fasteners.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in combination with a pair of asbestos panels that have aligned holes, a fastener comprising a bolt having a head, a nut on said bolt, a resilient and compressible sleeve on said bolt, a clip having a pair of spreadable fingers and a base to which said fingers are fastened, said base having an opening through which said bolt is passed, a washer having a convex surface and a concave surface, said sleeve having a convex flange at one end, said washer concave surface engaging an end surface of said sleeve and at least partially overlying said flange, said washer in contact with the head of the bolt, said washer being larger than the bolt head and smaller than the flange, said clip base contacting the opposite end of said sleeve and said fingers adjacent to the sides of the lower part of said sleeve, said nut engaging said base, means on the clip for preventing said nut from rotating with respect to said clip whereby said nut is moved axially on said bolt in response to rotation of said bolt with respect to said nut, said flange adapted to spread over an area of one of said panels in response to movement of said nut axially onto said bolt at which time the portion of said sleeve adjacent to said nut mushrooms over an area adjacent the other hole in the other of said panels whereby said sleeve lower portion and said flange constitute weather seals at opposite ends of said fastener, the distortion of the lower part of said sleeve being in a laterally outward direction with reference to the longitudinal axis of said bolt so that said fingers of said clips are spread by the spreading action of said portion of said sleeve and form a lock to prevent withdrawal of said fastener from said holes, said fingers spaced from each other, and means on said sleeve projecting from the surface thereof and in between said fingers to form stops against which opposite edges of said fingers abut to prevent mutual rotation between said clip and said sleeve.

2. The fastener of claim 1 wherein said sleeve is precompressed thereby increasing the firmness of the sleeve and spreading the sleeve to a predetermined diameter dimension adapting it to fit sungly in said holes and thereby forms a frictional binding action with the walls of the sleeve.

3. The structure as defined in claim 1 wherein said clip is of sheet metal construction with the fingers being disposed diametrically opposed to each other, said sleeve having a reduced area at one end thereof, the last-named means including longitudinal ribs extending axially of the reduced area and received between the fingers, said ribs and fingers all being disposed within the confines of the cross-sectional area of the major length of the sleeve thereby enabling the entire assembly to be inserted through the panels from one surface thereof and to be tightened by rotating the bolt head while pushing inwardly thereon whereby the engagement between the flange and the panels will prevent rotation of the sleeve.

References Cited in the file of this patent

UNITED STATES PATENTS

| | | |
|---|---|---|
| 670,922 | Marquardt | Mar. 26, 1901 |
| 1,349,977 | Mulkern | Aug. 17, 1920 |
| 1,621,854 | Saloun | Mar. 22, 1927 |
| 1,638,671 | Wagner | Aug. 9, 1927 |
| 1,919,666 | Patterson | July 25, 1933 |
| 2,278,217 | Rodanet | Mar. 31, 1942 |
| 2,403,330 | Benton | July 2, 1946 |
| 2,688,894 | Modrey | Sept. 14, 1954 |
| 2,744,591 | Simpson | May 8, 1956 |
| 2,753,610 | Miller | July 10, 1956 |
| 2,870,812 | Heller | Jan. 27, 1959 |

FOREIGN PATENTS

| | | |
|---|---|---|
| 704,510 | Great Britain | Feb. 24, 1954 |
| 740,663 | Great Britain | Nov. 16, 1955 |